US010377422B2

(12) United States Patent
Murray et al.

(10) Patent No.: US 10,377,422 B2
(45) Date of Patent: Aug. 13, 2019

(54) VEHICLE CHASSIS STRUCTURES

(71) Applicant: Gordon Murray Design Limited, Shalford, Surrey (GB)

(72) Inventors: Ian Gordon Murray, Puttenham (GB); Frank Coppuck, Hook (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 0 days.

(21) Appl. No.: 15/321,908

(22) PCT Filed: Jun. 25, 2015

(86) PCT No.: PCT/EP2015/064370
§ 371 (c)(1),
(2) Date: Dec. 23, 2016

(87) PCT Pub. No.: WO2015/197761
PCT Pub. Date: Dec. 30, 2015

(65) Prior Publication Data
US 2017/0129541 A1    May 11, 2017

(30) Foreign Application Priority Data
Jun. 27, 2014   (GB) .................................. 1411454.0

(51) Int. Cl.
*B62D 23/00* (2006.01)
*B62D 21/18* (2006.01)
(Continued)

(52) U.S. Cl.
CPC ......... *B62D 23/005* (2013.01); *B62D 21/183* (2013.01); *B62D 27/026* (2013.01); *B62D 29/005* (2013.01)

(58) Field of Classification Search
CPC .... B62D 21/183; B62D 23/005; B62D 25/02; B62D 27/026; B62D 29/005
(Continued)

(56) References Cited

U.S. PATENT DOCUMENTS

2011/0024221 A1*  2/2011  Murray ................ B62D 23/005
                                                                   180/312
2011/0121610 A1    5/2011  Stanton

FOREIGN PATENT DOCUMENTS

DE         19908833 A1    9/2000
EP         2865582 A1 *   4/2015  ........... B62D 27/023
(Continued)

OTHER PUBLICATIONS

English translation of JP 2006-328945; retrieved via J-Plat-Pat on Sep. 4, 2018, located at https://www4.j-platpat.inpit.go.jp/eng/tokujitsu/tkbs_en/TKBS_EN_GM101_Top.action. (Year: 2018).*
(Continued)

*Primary Examiner* — Jason S Daniels
(74) *Attorney, Agent, or Firm* — Westman, Champlin & Koehler, P.A.; Z. Peter Sawicki; Amanda M. Prose

(57) ABSTRACT

A chassis and a method of forming the chassis comprising assembling a framework of interconnected tubular-section metallic members and a plurality of composite panels, each panel being adhesively bonded to a plurality of the metallic members, wherein at least one bond between a composite panel and a metallic member is formed by an arcuate formation integral with and extending from an edge of a planar section of the composite panel and fitting around an exterior of the metallic member, and providing a layer of adhesive along the gap there between extending substantially from the edge of the planar section across a part of but less than the complete angular extent of the arcuate section.

13 Claims, 4 Drawing Sheets

(51) Int. Cl.
*B62D 27/02* (2006.01)
*B62D 29/00* (2006.01)

(58) Field of Classification Search
USPC .......................................... 296/205
See application file for complete search history.

(56) References Cited

FOREIGN PATENT DOCUMENTS

| GB | 2458956 A | 10/2009 | | |
|---|---|---|---|---|
| GB | 2503886 A | 1/2014 | | |
| JP | 2006-328945 A | 12/2006 | | |
| JP | 2008-296556 A | 12/2008 | | |
| WO | 01/81155 A2 | 11/2001 | | |
| WO | WO-2013191093 A1 * | 12/2013 | ........... | B62D 27/023 |

OTHER PUBLICATIONS

Search Report issued in corresponding GB patent application No. 1411454.0, dated Dec. 15, 2014.
International Search Report and Written Opinion for corresponding international patent application No. PCT/EP2015/064370, dated Oct. 8, 2015.

* cited by examiner

VEHICLE CHASSIS STRUCTURES

This application is a Section 371 National Stage Application of International Application No. PCT/EP2015/064370, filed Jun. 25, 2015, and published as WO2015/197761 on Dec. 30, 2015, which claims priority to and benefits of GB Patent Application Serial No. 1411454.0 filed Jun. 27, 2014, the entire contents of which are incorporated herein by reference.

FIELD OF THE INVENTION

The present invention relates to structures for use as vehicle chassis.

BACKGROUND ART

In our earlier patent application published as WO2009/122178, we described a novel structure for a vehicle chassis in which a tubular framework is reinforced with composite panels bonded to the framework. This creates a lightweight and rigid chassis which nevertheless has good impact resistance, provides stable hardpoints for suspension and engine mounts (etc), and can be manufactured inexpensively.

SUMMARY OF THE INVENTION

In such a structure, it is necessary to provide an adhesive bond between the composite panel and the tubular framework. To keep down the costs of forming the framework, at least some of the tubular elements are of a circular-section in order to allow the use of 3D digital tube bending methods to form them into shape. This means that the bond between the panel and the tube must be along the arc of the tube outer surface. As this bond is an important part of the mechanical strength of the chassis as a whole, an improvement in the reliability and strength of this bond would be useful.

The present invention therefore provides a vehicle chassis comprising a framework of interconnected tubular-section metallic members and a plurality of composite panels, each panel being adhesively bonded to a plurality of the metallic members, wherein at least one bond between a composite panel and a metallic member is formed by an arcuate formation integral with and extending from an edge of a planar section of the composite panel and fitting around an exterior of the metallic member, and a layer of adhesive along the gap therebetween extending substantially from the edge of the planar section across a part of but less than the complete angular extent of the arcuate section.

The invention also provides a method of forming a vehicle chassis, comprising the steps of assembling a framework of tubular-section metallic members, providing a plurality of composite members, at least one of which has a planar section and, at an edge thereof, an arcuate formation substantially matching an external profile of a metallic member, applying an adhesive bead along the arcuate formation to a predetermined depth and covering an angular extent of the arcuate formation that is less than the complete extent thereof, bringing together the at least one composite member and the metallic member so that the metallic member sits within the arcuate formation and a spacing between them is less than the predetermined depth.

The tubular sections can be hollow in order to reduce the weight of the chassis.

Generally, the composite panels are relatively thick in order to provide the required mechanical properties. The arcuate formation is, in use, adhered to the metallic tubular member and can therefore be thinner than the planar section.

The arcuate formation preferably has a first free edge and a second edge that is contiguous with the planar section; in this case, we prefer that the bead of adhesive is applied to the arcuate section closer to the second edge than to the first edge.

The spacing between the tubular metallic member and the arcuate formation is preferably significantly less than of the predetermined depth, such as 50% or less, more preferably 40% or less, and still more preferably a nominal value that is less than 30% of the predetermined depth.

The present invention also relates to a vehicle comprising a chassis as set out above.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
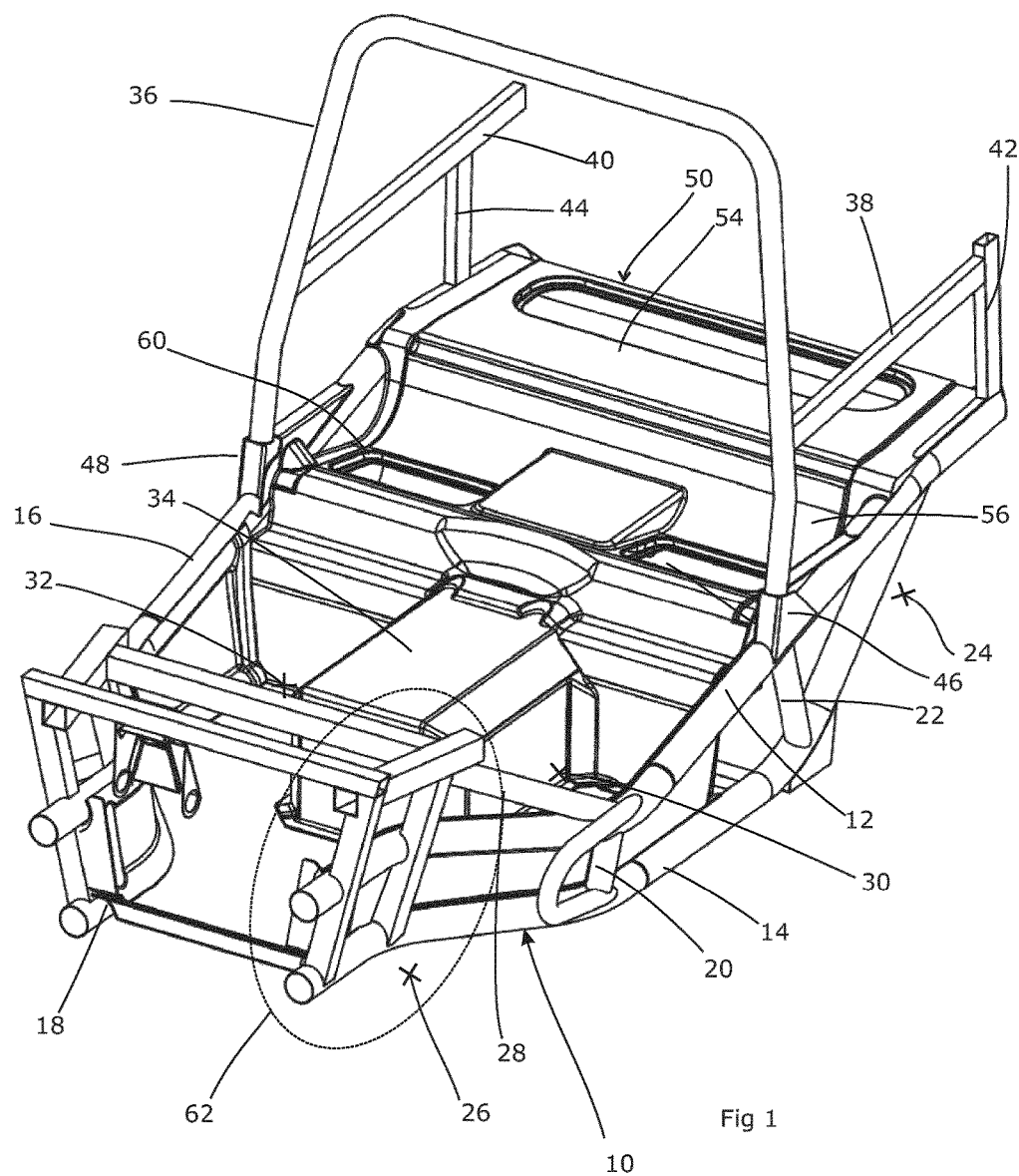
FIG. 1 shows a composite chassis structure.

FIG. 1 shows a tubular frame construction used in the manufacture of vehicle chassis as described in our earlier publication WO2009/122178. The frame structure 10 comprises a series of 4 longitudinal members, two members 12, 14 on a left hand side of the vehicle and two members 16, 18 on a right hand side of the vehicle. The members on each respective side are connected via various riser elements 20, 22 and by the lower longitudinal member 14, 18 of the two rising towards the rear of the car so as to meet the corresponding upper member 12, 16. This rising profile also creates a space 24 at the rear of the car to accommodate the rear running gear. Likewise, at the front of the car all four longitudinal members include bends so as to divert them inwardly towards the centre line of the car and create a space 26 for the front running gear.

To hold the longitudinal members 12, 14, 16, 18 at the correct spacing, cross members such as that shown at 28 are provided, attached to the longitudinal members and extending transversely across the vehicle. Thus, a tubular frame structure is obtained.

These tubes are large diameter steel (or aluminium) thin wall tube which is cut and bent by CNC (computer numeric control) processes. The ends of the tube can currently be profiled by CNC laser apparatus followed by CNC bending and robotic welding. As a result, the steel structure of the chassis can be built up from sections of tubing, which are themselves obtained from elongate narrow steel strip. That is intrinsically straightforward to produce, bend and weld into a steel tube form, as opposed to a conventional pressed steel chassis which requires a single large steel billet to be forged into the necessary shape. The wastage of material and the energy required to form and assemble the tubular frame is therefore very much less than the equivalent steel pressing.

The multi-tubular structure created in this way is largely self-jigging, therefore requiring minimal additional parts for construction. Once the structure has been welded together, external and internal protection for the exposed steel can be applied via a suitable chemical bath.

The chassis illustrated herein by way of example is intended for use in relation to a three-seater personal transport vehicle as illustrated in (for example) our earlier patent application number WO2008/110814. Accordingly, the structure provides footwell areas 30, 32 for the two rear passengers and a seating area 34 for the centrally positioned driver. However, other vehicle designs and layouts could be catered for in the design.

A steel roll hoop 36 is provided to the rear of the chassis, extending upwardly from and forming part of the framework 10. A pair of upper longitudinal members 38, 40 extend rearwardly from the roll hoop 36 and thus supported by struts 42, 44. The roll hoop 36 is accommodated within a pair of sockets 46, 48 that had previously been welded onto the longitudinal members 12, 16; this offers a secure location for the roll hoop 36. Side members 38, 40 extend rearwardly from the roll hoop and provide a means of mounting the rear body panels. To this complete tubular frame structure, a rigid sheet 50 is then added, The rigid sheet 50 has two main purposes. One is to reinforce the multi-tubular structure by transmitting loads between the tubular members, thereby increasing the rigidity of the structure as a whole and improving its crashworthiness. To this end, the sheet is made of a suitable rigid composite material. Various composite materials are suitable including carbon fibre composite, Kevlar fibre composite, glass fibre composite, and other composite materials such as metal matrix composites. An especially suitable composite material is one comprising a core of one material and a coating of a second material; suitable cores include paper-based materials and suitable coatings include fibre-reinforced plastics materials.

In support of its reinforcement task, the sheet is also formed into a non-flat shape so that it can offer rigidity against torsion. A flat sheet obviously only offers a high torsional rigidity about one axis, whereas a sheet with compound bends (i.e. bends in more than one non-parallel axis) can offer rigidity in substantially all dimensions. To achieve the same effect, the sheet 50 can be made up of several smaller sections that are individually attached to the framework 10 in order to build up a non-flat shape.

The secondary purpose of the sheet 50 is to provide an internal structure to the vehicle, covering the apertures between tubular members. Thus, the sheet or sheets are moulded according to a compound shape that is convenient for the intended layout of the vehicle. Starting from the rear 52 of the vehicle, there is a flat panel 54 which acts as a parcel shelf or (in this case) as the floor of a load area over a rear-mounted engine compartment, then a downward curve 56 to provide an inclined seat backrest for the rear seat passengers. After curving upwards again to provide the rear seat squabs 60, the outer parts of the sheet 50 then curves downward to provide the footwells 30, 32 for the rear seat passengers. A central part extends forward as a ridge formation 34 to support a centrally mounted driver's seat; this, together with upright side panels either side of the footwell and side panels either side of the rear seats provides a three-dimensional compound curvature to the sheet 50.

Recesses are formed in the sheet 50 at locations that correspond to tubular sections in the framework 10. These allow the sheet 50 to follow and conform to the shape of parts of the framework 10 and be bonded to it, for example via a suitable engineering adhesive such as an epoxy resin. This permits forces to be transferred between the framework 10 and the sheet 50, thereby allowing the sheet 50 to contribute to the rigidity and crashworthiness of the chassis. Thus, the recesses in the sheet 50 curve around a tube of the framework 10 and are bonded to the relevant tube so that the sheet 50 and framework 10 form a single loadbearing structure to which the engine, running gear, internal and external trim etc can be fitted.

Figure 2:
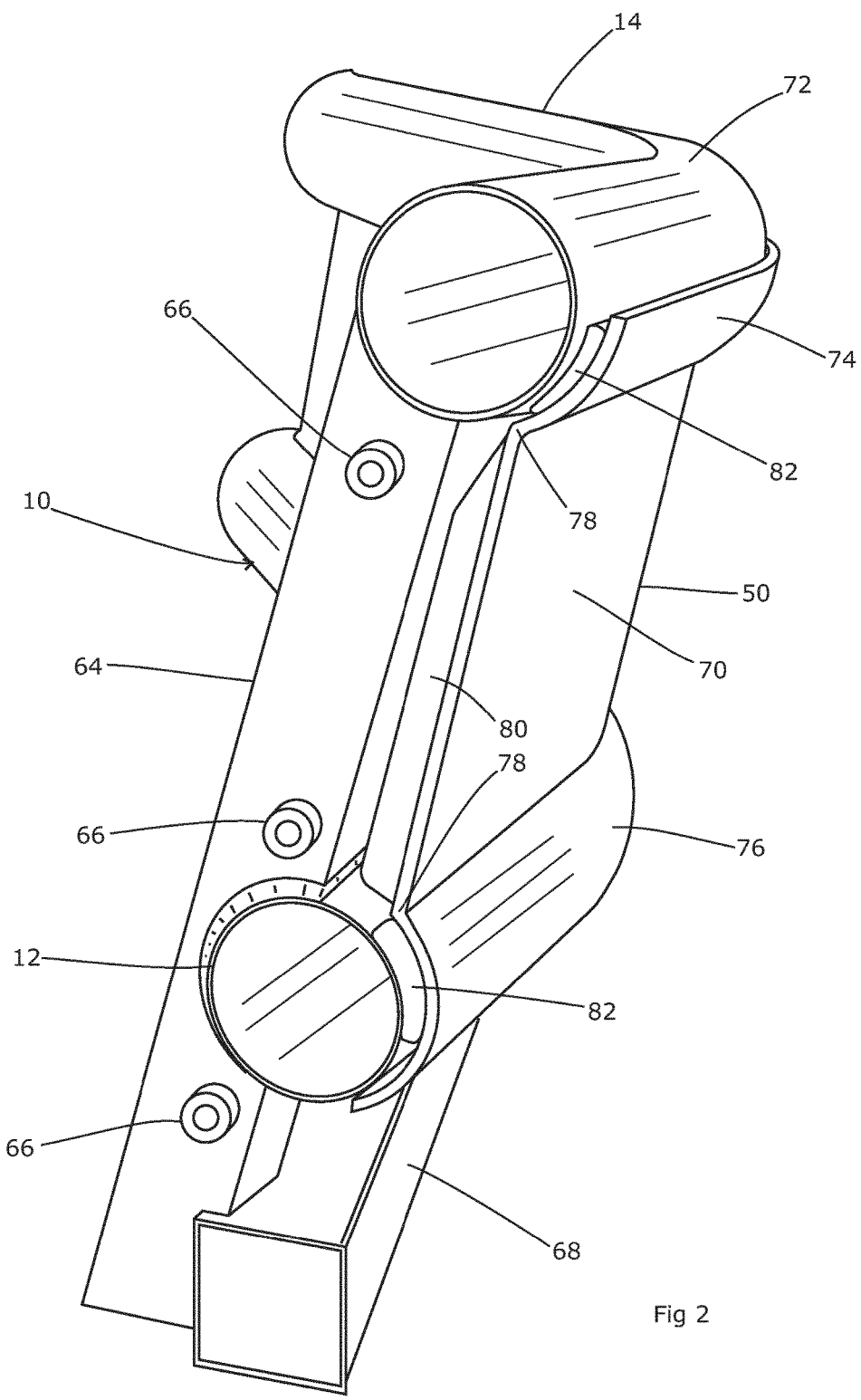
FIG. 2 shows a part of the chassis of FIG. 1 in more detail.
Figure 3:
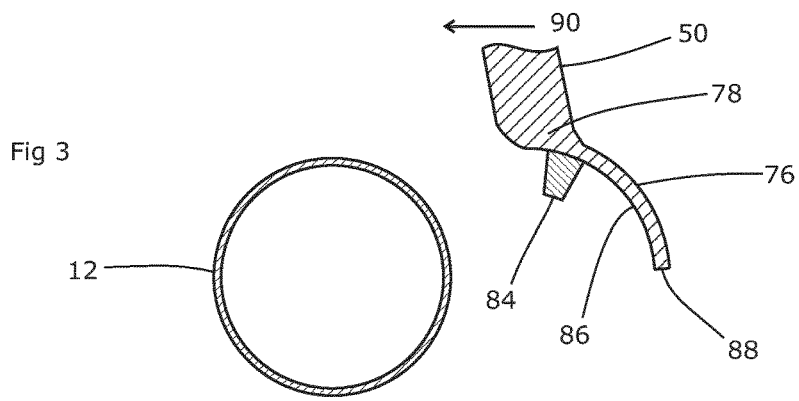
FIGS. 3, 4, 5, and 6 show sequential steps in attaching the composite panel to the tubular section.

FIG. 2 shows a section of the chassis for the front-left lower section 62 in more detail, shown in an inverted orientation to assist with assembly. The steel framework 10 in this region includes the circular-section longitudinal members 12, 14 which have been bent to the necessary shape, together with a square-section riser element 64 that carries a number of fixing points 66 for ancillaries such as braking components, steering components and bodywork, and a square-section top member 68 which together form the local part of the framework.

The composite panel 50 covering this part of the framework 10 is an upright section stretching between the longitudinal members 12, 14. It has a central section 70 which is generally planar in that it stretches directly from one longitudinal member 12 to the other member 14, but which also has smooth curves to match the bends 72 in the longitudinal members 12, 14. The edges of the panel 50 that run adjacent to the longitudinal members 12, 14 are formed into arcuate sections 74, 76 which are curved so as to be substantially concentric with the outer cylindrical faces of the tubular-section longitudinal members 12, 14. Each arcuate section arcs around the outer surface of the longitudinal member through an angle of between 90° and 135°. To assist with this, each starts with a 45° bend 78 outwards out of the (local) plane of the central section 70.

The central section 70 includes a thickened portion 80 to provide the panel with the necessary stiffness. This may include voids such as a honeycomb structure in order to minimise the weight of the panel. To create clean and environmentally-resistant edges to the panel, a thinner non-honeycomb rim around the edge is formed, and the arcuate sections 74, 76 are moulded into that thinner rim.

A small spacing is maintained between the arcuate sections 74, 76 and the outer faces of the longitudinal members 12, 14, in which a layer 82 of epoxy resin adhesive is sandwiched in the manner to be described below. This bonds the panel 50 to the framework 10 and contributes to the rigidity and strength of the chassis.

FIGS. 3 to 6 show sequential steps in adhering the panel 50 to the longitudinal members 12, 14, illustrating the attachment between the panel 50 and the member 12. A bead 84 of epoxy resin adhesive is applied to the inner face 86 of the arcuate section 76. Importantly, the bead 84 only covers a subsection of the inner face 86 and does not cover the whole of the inner face. The bead is slightly taller than it is wide at its base, and tapers towards its exposed tip so as to be about half as wide at its tip as at its base. The illustrated bead has nominal dimensions of 10 mm wide at the base, 5.4 mm wide at its tip, and 11.5 mm deep but obviously there will be some variation in practice due to the viscous nature of the resin. The bead 84 is located on the arcuate section 76 closer to the bend 78 than to the free edge 88.

Figure 4:
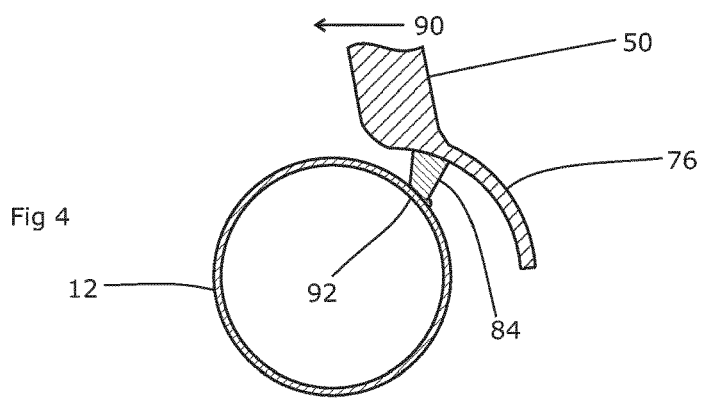
Figure 5:
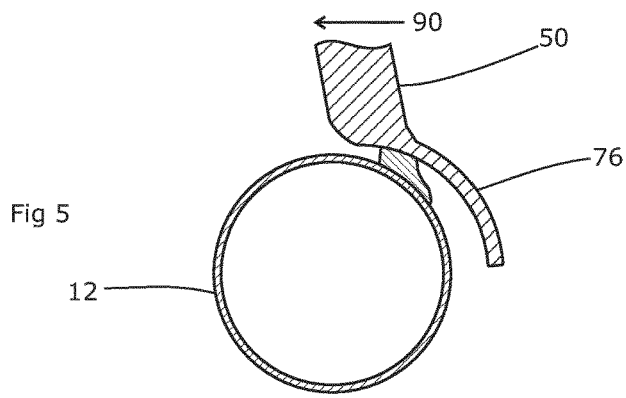

With the adhesive bead 84 in position, the panel 50 is brought towards the longitudinal member 12 in the direction of arrow 90. FIG. 4 illustrates the point at which the tip of the bead 84 meets the outer surface of the longitudinal member 12; as a result of the relatively large depth and relatively narrow width of the bead, the tip meets the outer surface at an angular location 92 on the longitudinal member 12 that is displaced from the angular location on the base of the bead on the arcuate section 76. Thus, as movement of the panel 50 continues in the direction of arrow 90, the bead 84 is smeared across the outer surface of the longitudinal member 12 and the inner surface of the arcuate section 76. This smearing process eliminates air naturally, as opposed to a simple flat layer of adhesive meeting the surface head-on, and thus creates a good bond with both surfaces.

Once the panel 50 has been moved into its nominal position (FIG. 6), the former bead 84 has been smeared into the layer 82 of adhesive which can then be left to cure. Ideally, the panel 50 will be supported in position during at least an initial part of this curing process. The intimate contact between the resin layer 82 and the adjacent surfaces created by this assembly method ensures a strong bond.

Figure 6:
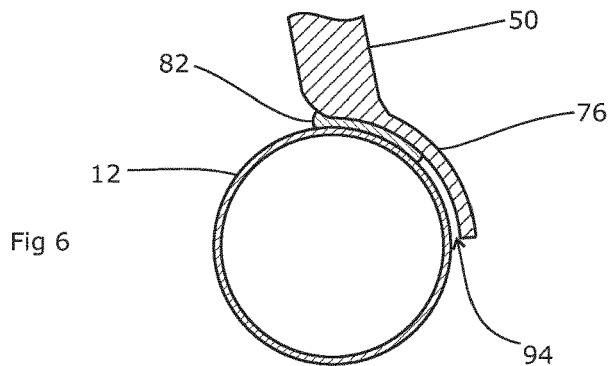

FIG. 6 shows the assembled joint in its nominal or intended position with (in this example) a 3 mm gap between the arcuate section 76 and the longitudinal member 12, partly filled with the resin layer 82. Roughly half the angular extent of the overlap between the panel 50 and the longitudinal member 12 is filled with the resin adhesive layer 82, leaving about half of the 90° overlap with an air gap 94 between the two parts.

Figure 7:
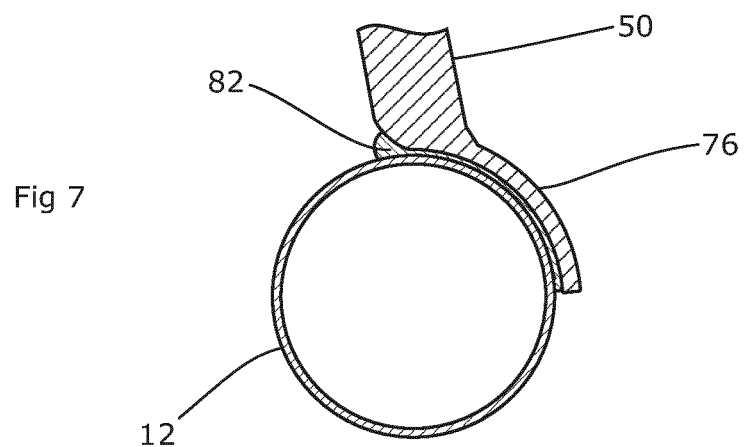
FIG. 7 shows the effect of too close an approach by the composite panel to the tubular section.

FIG. 7 shows the effect of a closer approach arcuate section 76 and the longitudinal member 12, in the form of the minimum gap between the two parts to ensure proper operation of the adhesive, in this example 1.5 mm. The close approach squeezes the resin into the previously unused section of overlap, eliminating the air gap 94 and filling this with adhesive instead. The adhesive is just short of being expelled from the join area. As a result, by designing the size of the bead 84 to just fill the gap at the minimum tolerance for the separation between the two, the presence or absence of leakage from the overlap region provides a clearly visible binary indicator as to whether this tolerance has been complied with.

Figure 8:
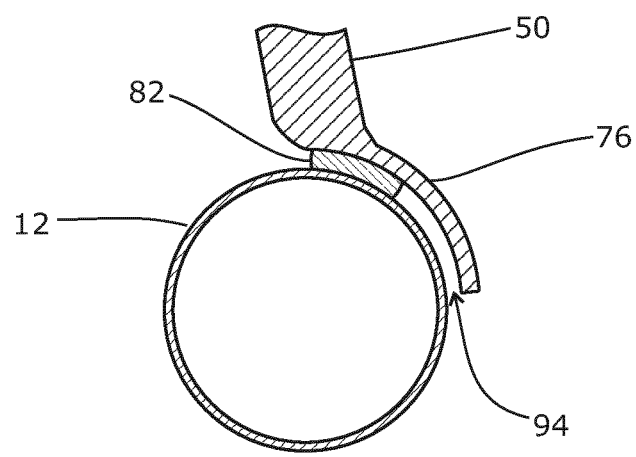
FIG. 8 shows the effect of an insufficiently close approach by the composite panel to the tubular section.

FIG. 8 shows the result of allowing a maximum tolerance of the gap between the arcuate section 76 and the longitudinal member 12, in this case 4.5 mm. The bead 84 has, importantly, still made contact with both parts and although it has not spread as far across the overlap region as shown in FIG. 6 or 7, it has a bond footprint that is sufficient for the structural requirements of the join.

Thus, the necessary bond strength dictates the minimum bond footprint, which together with the maximum gap tolerance dictates the cross-sectional area of the bead 84. The minimum gap tolerance (together with the cross-sectional area of the bead 84) then dictates the length of the overlap and thus its angular extent. Given the necessary cross-sectional area of the bead 84, this then allows a precise shape to be formulated which is a multiple of (between 2 and 4 times) the nominal gap, and ideally slightly tapered.

Thus, assembling the joint in this manner with (by design) an air gap 94 between the arcuate section and the longitudinal member 12 over part of the overlap and adhesive in the remainder of the overlap leads to a design strategy for the adhesive bead 84 which creates an intimate contact between the two surfaces and the resin, and accommodates the complete range of tolerance in positioning the items. As a result, the quality and the reproducibility of the bond is ensured.

It will of course be understood that many variations may be made to the above-described embodiment without departing from the scope of the present invention.

The invention claimed is:

1. A vehicle chassis comprising a framework of interconnected tubular-section metallic members and a plurality of load bearing composite panels, each panel being adhesively bonded to a plurality of the metallic members, wherein at least one bond between a composite panel and a metallic member is formed by an arcuate formation integral with and extending from an edge of a planar section of the composite panel and fitting around an exterior of the metallic member, and a layer of adhesive along a gap therebetween extending substantially from the edge of the planar section across a part of but less than the complete angular extent of the arcuate section, and wherein the adhesive adjacent the edge of the planar section provides a clearly visible indicator of correct positioning of the arcuate formation relative the metallic member.

2. The vehicle chassis according to claim 1 in which the tubular sections are hollow.

3. The vehicle chassis according to claim 1 in which the planar section of the composite panel is thicker than the arcuate formation of the composite panel.

4. The vehicle chassis according to claim 1 in which the arcuate formation has a first free edge and a second edge that is contiguous with the planar section.

5. A vehicle comprising a chassis according to claim 1.

6. A method of forming a vehicle chassis comprising the steps of;
assembling a framework of tubular-section metallic members;
providing a plurality of load bearing composite members, at least one of which has a planar section and, at an edge thereof, an arcuate formation substantially matching an external profile of a metallic member;
applying an adhesive bead along the arcuate formation to a predetermined depth and covering an angular extent of the arcuate formation that is less than the complete extent thereof such that the adhesive adjacent the edge or the planar section provides a clearly visible indicator of correct positioning of the arcuate formation relative the metallic member;
bringing together the at least one composite member and the metallic member so that the metallic member sits within the arcuate formation and a spacing between them is less than the predetermined depth.

7. The method of forming a vehicle chassis according to claim 6 in which the tubular sections are hollow.

8. The method of forming a vehicle chassis according to claim 6 in which the planar section of the composite panel is thicker than the arcuate formation of the composite panel.

9. The method of forming a vehicle chassis according to claim 6 in which the arcuate formation has a first free edge and a second edge that is contiguous with the planar section.

10. The method of forming a vehicle chassis according to claim 9 in which the bead of adhesive is applied to the arcuate section closer to the second edge than to the first edge.

11. The method of forming a vehicle chassis according to claim 6 in which the spacing is less than 50% of the predetermined depth.

12. The method of forming a vehicle chassis according to claim 6 in which the spacing is less than 40% of the predetermined depth.

13. The method of forming a vehicle chassis according to claim 6 in which the spacing is less than 30% of the predetermined depth.

* * * * *

UNITED STATES PATENT AND TRADEMARK OFFICE
CERTIFICATE OF CORRECTION

PATENT NO. : 10,377,422 B2
APPLICATION NO. : 15/321908
DATED : August 13, 2019
INVENTOR(S) : Murray et al.

Page 1 of 1

It is certified that error appears in the above-identified patent and that said Letters Patent is hereby corrected as shown below:

In the Claims

Under Column 6, Claim 6, Line 37:
Please delete "or the planar section provides a clearly visible indicator"
And insert --of the planar section provides a clearly visible indicator--

Signed and Sealed this
Seventeenth Day of November, 2020

Andrei Iancu
*Director of the United States Patent and Trademark Office*